(12) United States Patent
Kim (10) Patent No.: US 12,166,815 B2
(45) Date of Patent: Dec. 10, 2024

(54) EDGE SERVICE SUPPORT SERVER AND OPERATING METHOD OF EDGE SERVICE SUPPORT SERVER

(71) Applicant: SK TELECOM CO., LTD., Seoul (KR)

(72) Inventor: Keun Hyun Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/025,422

(22) PCT Filed: Sep. 10, 2021

(86) PCT No.: PCT/KR2021/012336
§ 371 (c)(1),
(2) Date: Mar. 9, 2023

(87) PCT Pub. No.: WO2022/055295
PCT Pub. Date: Mar. 17, 2022

(65) Prior Publication Data
US 2024/0015207 A1 Jan. 11, 2024

(30) Foreign Application Priority Data
Sep. 10, 2020 (KR) .................. 10-2020-0116170

(51) Int. Cl.
*H04L 67/1021* (2022.01)
*H04L 67/51* (2022.01)
*H04L 67/52* (2022.01)

(52) U.S. Cl.
CPC ......... *H04L 67/1021* (2013.01); *H04L 67/51* (2022.05); *H04L 67/52* (2022.05)

(58) Field of Classification Search
CPC ...... H04L 67/1021; H04L 67/51; H04L 67/52
See application file for complete search history.

(56) References Cited

U.S. PATENT DOCUMENTS

| | | | |
|---|---|---|---|
| 9,137,106 B2 | 9/2015 | Mccarthy et al. | |
| 2020/0169610 A1* | 5/2020 | Wang | H04W 8/18 |

FOREIGN PATENT DOCUMENTS

| | | |
|---|---|---|
| CN | 111225074 | 6/2020 |
| EP | 3657765 | 5/2020 |
| KR | 10-2020-0005507 | 1/2020 |
| WO | WO 2017/100640 | 6/2017 |
| WO | WO-2017100640 A1 * | 6/2017 |
| WO | WO 2019/199362 | 10/2019 |

OTHER PUBLICATIONS

International Search Report dated Dec. 9, 2021 issued in Application No. PCT/KR2021/012336.
Chinese Office Action dated Aug. 16, 2024 issued in Application No. 202180062147.1.

* cited by examiner

*Primary Examiner* — Suraj M Joshi
(74) *Attorney, Agent, or Firm* — KED & ASSOCIATES, LLP (57) ABSTRACT

The present disclosure relates to an edge service supporting server and a method for operating an edge service supporting server, wherein an infrastructure of cloud computing technology is forwardly disposed at a station of a communication operator network, thereby implementing an ultra-low latency edge computing service.

16 Claims, 5 Drawing Sheets

EDGE SERVICE SUPPORT SERVER AND OPERATING METHOD OF EDGE SERVICE SUPPORT SERVER

CROSS-REFERENCE TO RELATED PATENT APPLICATIONS

This application is a U.S. National Stage Application under 35 U.S.C. § 371 of PCT Application No. PCT/KR2021/012336, filed Sep. 10, 2021, which claims priority to Korean Patent Application No. 10-2020-0116170, filed Sep. 10, 2020, whose entire disclosures are hereby incorporated by reference.

TECHNICAL FIELD

The present disclosure relates to a scheme for implementing an ultra-low latency edge computing service by forwardly disposing an infrastructure of a cloud computing technology at a station of a communication operator network.

The present application claims priority to Korean Patent Application No. 10-2020-0116170, filed on Sep. 10, 2020, the disclosure of which is herein incorporated by reference in its entirety.

BACKGROUND ART

Cloud computing technology, which is Internet-based computing technology, refers to a technology for integrating and providing resources of computers existing in different physical positions through virtualization technology.

According to the cloud computing technology, computer system resources such as data storage (cloud storage) and computing power have on-demand availability without manual management by users.

Therefore, the cloud computing technology enables a user to use necessary hardware in a virtual space, and provides a user environment in which, without having to install software in his/her computer, the user can always use the same through Internet access and can easily share data with various information communication devices.

Meanwhile, such a cloud computing technology may enable a service provider to provide a service in such a manner that computing resources are provided (leased) to unspecified multiple companies, institutions, or individuals through public Internet networks.

If computing resources (common resources) are physically shared and used by unspecified multiple companies, institutions, or individuals in this manner, the distance to the computing resources differs in each service using position because commonly available computing resources are used in different physical positions.

As a result, the service quality may differ in each service using position due to the difference in distance from computing resources. If the distance from computing resources is above a predetermined distance, communication latency resulting from the large distance may result in a substantially worse service quality than other service using positions.

Particularly, in view of recent trend requiring ultra-low latency (RTT) of a single-digit ms or within 10 ms in each service using position and requiring large-capacity bandwidths of hundreds of Mbps to single-digit Gbps per stream, the above-mentioned communication latency caused by the distance from computing resources may be a major factor that seriously degrades the service satisfaction.

Therefore, the present disclosure may provide a new scheme capable of implementing an ultra-low latency service in a cloud computing environment.

DISCLOSURE

Technical Problem

The present disclosure has been made in view of the above-mentioned situations, and it is an aspect of the present disclosure to provide a scheme for implementing an ultra-low latency edge computing service by forwardly disposing an infrastructure of cloud computing technology at a station of a communication operator network.

Technical Solution

In accordance with aspect, an edge service supporting server according to an embodiment of the present disclosure may include: a receiving unit configured to receive processing entrustment regarding a cloud-based edge computing service request from a terminal; and a processing unit configured to acquire, on the basis of service identification information regarding an edge computing service requested by the terminal, server access information regarding a target application server from application servers of each edge area in which an application for the edge computing service is installed, according to the processing entrustment, wherein the target application server is able to be accessed by the terminal in a communication operator network in which the edge computing service is requested.

Specifically, the edge service supporting server may further include a return unit configured to return the server access information regarding the target application server to the terminal as a result of processing the processing entrustment such that the terminal can receive the edge computing service from the target application server according to the server access information.

Specifically, the processing entrustment may be received from the terminal when an application client for the edge computing service is executed in the terminal.

Specifically, the service identification information may include public access information allocated from the terminal in the edge computing service environment, and the processing unit may identify a specific service zone in a communication operator network matching with the public access information, according to the public access information, such that an application server in at least some edge areas related to the specific service zone, among all edge areas, can be determined as the target application server.

Specifically, the specific service zone may be identified, according to matching information between private access information allocated to the terminal in the communication operator network and the public access information, as a service zone in which the private access information matching with the public access information is allocated, among service zones of the communication operator network.

Specifically, the target application server may be determined as an application server in an edge area which belongs to the specific service zone, or which is disposed closest to the specific service zone.

Specifically, the service identification information may include application identification information indicating a specific application for the edge computing service, and the processing unit may be configured such that, according to the application identification information, an application server in a serviceable edge area in which the specific application is installed, among all edge areas, can be determined as the target application server.

Specifically, when two or more target application servers exist, the processing unit may select one of the two or more target application servers as a target application server to be accessed by the terminal according to a predefined edge access policy.

In accordance with another aspect, a method for operating an edge service supporting server according to an embodiment of the present disclosure may include: a receiving step of receiving processing entrustment regarding a cloud-based edge computing service request from a terminal; and a processing step of acquiring, on the basis of service identification information regarding an edge computing service requested by the terminal, server access information regarding a target application server from application servers of each edge area in which an application for the edge computing service is installed, according to the processing entrustment, wherein the target application server is able to be accessed by the terminal in a communication operator network in which the edge computing service is requested.

Specifically, the method may further include a return step of returning the server access information regarding the target application server to the terminal as a result of processing the processing entrustment such that the terminal can receive the edge computing service from the target application server according to the server access information.

Specifically, the processing entrustment may be received from the terminal when an application client for the edge computing service is executed in the terminal.

Specifically, the service identification information may include public access information allocated from the terminal in the edge computing service environment, and in the processing step, a specific service zone in a communication operator network matching with the public access information may be identified, according to the public access information, such that an application server in at least some edge areas related to the specific service zone, among all edge areas, can be determined as the target application server.

Specifically, the specific service zone may be identified, according to matching information between private access information allocated to the terminal in the communication operator network and the public access information, as a service zone in which the private access information matching with the public access information is allocated, among service zones of the communication operator network.

Specifically, the target application server may be determined as an application server in an edge area which belongs to the specific service zone, or which is disposed closest to the specific service zone.

Specifically, the service identification information may include application identification information indicating a specific application for the edge computing service, and in the processing step, according to the application identification information, an application server in a serviceable edge area in which the specific application is installed, among all edge areas, can be determined as the target application server.

Specifically, in the processing step, when two or more target application servers exist, one of the two or more target applications may be selected as a target application server to be accessed by the terminal according to a predefined edge access policy.

Advantageous Effects

According to an edge service supporting server and a method for operating an edge service supporting server of the present disclosure, in an edge computing service environment in which an edge area for providing an edge computing service based on a public cloud is forwardly disposed at a station of a communication operator network, a specific edge area matching with public access information (public IP) of a terminal, among edge areas managed with regard to respective services zones in the communication operator network, is selected as an edge area closest to the terminal, and the terminal is enabled to use an edge computing service through the selected edge area, thereby implementing an ultra-low latency edge computing service that minimizes communication latency caused by the distance between the terminal and the computing resource.

MODE FOR INVENTION

Hereinafter, an exemplary embodiment of the present disclosure will be described with reference to the accompanying drawings.

An embodiment of the present disclosure deals with cloud computing technology which enables a service provider to provide a service in such a manner that computing resources are provided (leased) to unspecified multiple companies, institutions, or individuals through public Internet networks.

In such a cloud computing environment, computing resources (common resources) are physically shared and used by unspecified multiple companies, institutions, or individuals, and such characteristics may result in communication latency depending on the distance between the service using position and the computing resources.

Accordingly, an embodiment of the present disclosure may implement an ultra-low latency edge computing service by forwardly disposing an infrastructure of cloud computing technology at a station of a communication operator network, thereby minimizing communication latency that may be caused by the distance between a service using position and a computing resource.

The communication operator network includes all types of communication networks to which edge computing (MEC) technology can be applied, and may be understood as including, for example, an LTE (4G) communication system and a 5G communication system.

Figure 1:
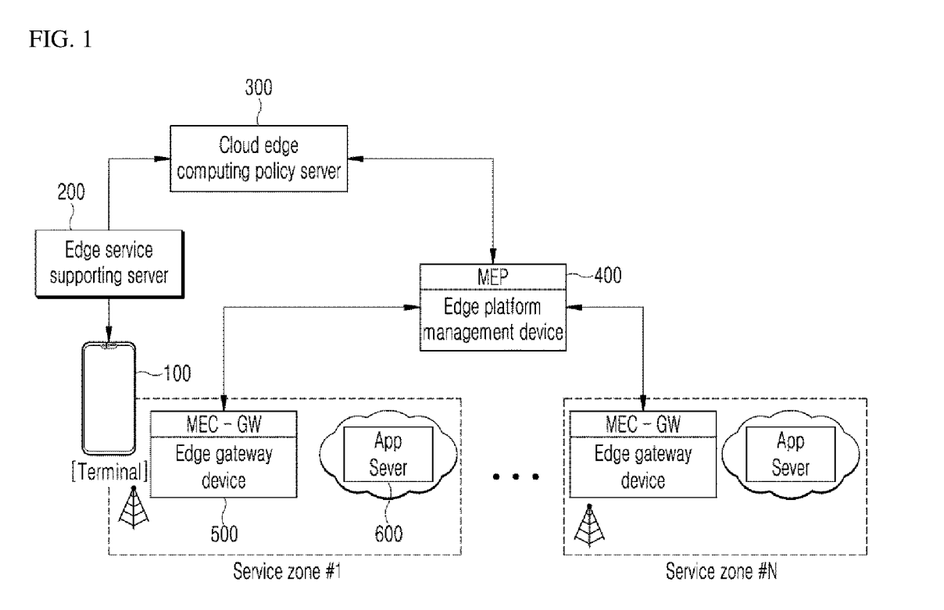
FIG. 1 illustrates an example of a cloud-based edge computing service environment according to an embodiment of the present disclosure.

In this regard, FIG. 1 illustrates an example of a cloud-based edge computing service environment according to an embodiment of the present disclosure.

As illustrated in FIG. 1, in an edge computing service environment based on a public cloud according to an embodiment of the present disclosure, each edge area in which a public cloud-based edge computing service can be provided is forwardly disposed at a station of a communication operator network, and the environment includes an edge service supporting server 200 configured to enable a terminal 100 to receive an edge computing service through an edge area closest to the terminal 100.

The terminal 100 corresponds to a mobile device having an application client installed therein to receive an edge computing service based on a public cloud.

In addition, the edge service supporting server 200 enables the terminal 100 to receive an edge computing service through an edge area closest to the terminal 100 through interworking between a cloud edge computing policy server 300 on the public cloud side and an edge platform management device 400 of the communication operator network at an edge computing service request of the terminal 100.

Particularly, the edge service supporting server 200 may be understood as an application server which processes an entrusted operation according to processing entrustment regarding an edge computing service request from an application client inside the terminal 100, and returns the processing result to the terminal 100.

Meanwhile, an edge area disposed at a station of a communication operator network as described above may be divided into a public cloud used by a service provider other than the communication operator to provide computing resources to individuals, and a private cloud independently operated by the communication operator network.

In this regard, the public cloud used by a service provider other than the communication operator to provide computing resources to individuals will be assumed in an embodiment of the present disclosure.

Accordingly, the application client installed in the terminal 100 in an embodiment of the present disclosure may be implemented as a thin client capable of minimizing the operation or dependency of the terminal 100 in connection with receiving an edge computing service.

In addition, the edge platform management device 400 may be understood as a device for managing each edge area forwardly disposed at a station of a communication operator, with regard to each service zone (for example, Seoul zone, Busan zone, Gwangju zone) through an edge gateway device 500.

The edge gateway device 500 is constructed in a mobile edge platform (MEP) in each service zone.

The above-described configuration enables a terminal 100 to use an edge computing service from an edge area closest to the terminal 100 in a cloud-based edge computing service environment according to an embodiment of the present disclosure. The configuration of the edge service supporting server 200 for implementing the same will be described in more detail.

Prior to the description, it will be assumed that, in an embodiment of the present disclosure, each application server 600 having an identical application installed therein exists in each edge area forwardly disposed at a station of a communication operator, in order to provide an edge computing service to the terminal 100.

Figure 2:
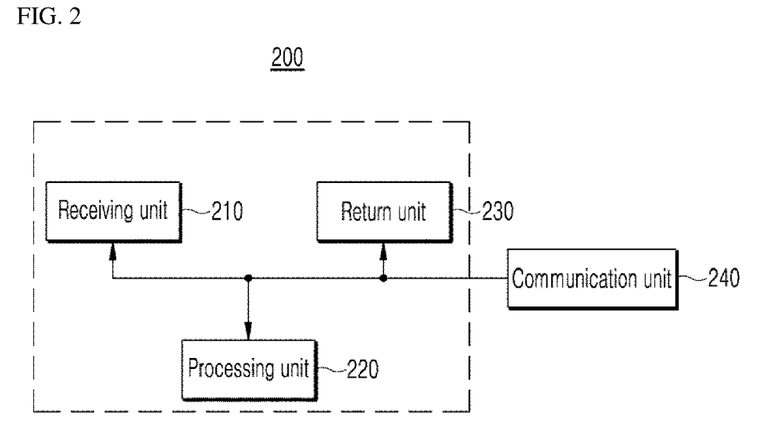
FIG. 2 schematically illustrates the configuration of an edge service supporting server according to an embodiment of the present disclosure.

FIG. 2 schematically illustrates the configuration of the edge service supporting server 200 according to an embodiment of the present disclosure.

As illustrated in FIG. 2, the edge service supporting server 200 according to an embodiment of the present disclosure may include a receiving unit 210 configured to receive processing entrustment regarding an edge computing service request, and a processing unit 220 configured to process an operation entrusted by the terminal 100.

In addition, the edge service supporting server 200 according to an embodiment of the present disclosure may further include a return unit 230 configured to return the result of processing entrustment, besides the above-mentioned components.

All or some of the components of the edge service supporting server 200 may be implemented as hardware modules or software modules, or implemented as combinations of a hardware module and a software module.

As used herein, a software module may be understood as an instruction executed by a processor that processes an operation inside the edge service supporting server 200, for example, and such an instruction may be mounted in a separate memory inside the edge service supporting server 200.

Meanwhile, the cloud edge computing policy server 300 according to an embodiment of the present disclosure may further include a communication unit 240 which is an RF module in charge of a substantial communication function between the terminal 100 and the edge platform management device 400 inside the communication operator network, besides the above-mentioned components.

The communication unit 240 includes, for example, an antenna system, an RF transceiver, one or more amplifiers, a tuner, one or more oscillators, a digital signal processor, a codec chipset, a memory, etc., but is not limited thereto, and may include all known circuits performing these functions.

The cloud edge computing policy server 300 according to an embodiment of the present disclosure enables a terminal 100 to receive an edge computing service through an edge area positioned closest to the terminal 100 through the above-mentioned components. Hereinafter, respective components for implementing the same in the cloud edge computing policy server 300 will be described in more detail.

The receiving unit 210 performs a function of receiving processing entrustment regarding an edge computing service request.

More specifically, the receiving unit 210 receives processing entrustment regarding a public cloud-based edge computing service request.

In response to execution of an application client installed in the terminal 100, the receiving unit 210 may receive processing entrustment regarding an edge computing service request from the terminal 100.

That is, in response to execution of an application client installed in the terminal 100, the receiving unit 210 receives an edge computing service request transmitted from the terminal 100 as processing entrustment from the terminal 100 with regard to an edge computing service.

Figure 3:
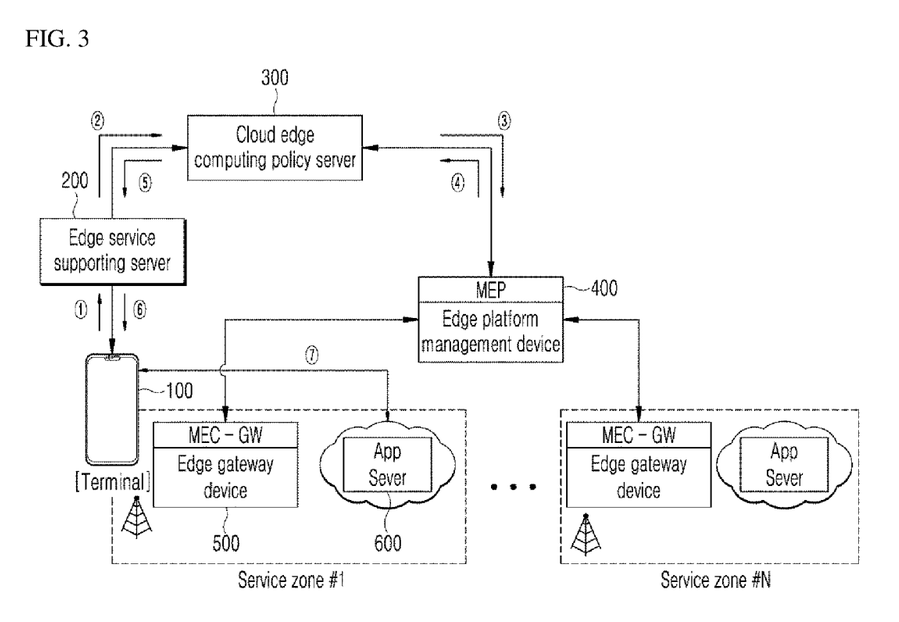
FIG. 3 illustrates an example of a signal flow in a cloud-based edge computing service environment according to an embodiment of the present disclosure.

In summary, in an embodiment of the present disclosure, when the application client installed in the terminal 100 is executed as in FIG. 3, the terminal 100 transfers an edge computing service request to the edge service supporting server 200 (①), and the edge service supporting server 200 receives such an edge computing service request as processing entrustment from the terminal 100.

The processing unit 220 performs a function of identifying service identification information according to processing entrustment from the terminal 100.

More specifically, upon receiving processing entrustment from the terminal 100, the processing unit 220 identifies service identification information regarding the edge computing service requested by the terminal 100, from the terminal 100.

In relation to the edge computing service requested by the terminal 100, the processing unit 220 may identify application identification information (app ID, PKG name) indicating a specific application for the edge computing service, and public access information (public IP) allocated to the terminal 100 in the edge computing service environment, as the service identification information.

The public access information (public IP) allocated to the terminal 100 is utilized as key information for recognizing a service zone in which the terminal 100 is positioned among edge areas managed with regard to respective service zones (for example, Seoul zone, Busan zone, Gwangju zone), and this will be described below in more detail.

In addition, the processing unit 220 performs a function of acquiring server access information (ME APP sever IP) regarding a target application server.

More specifically, upon identifying service identification information from the terminal 100, the processing unit 220 acquires server access information regarding a target application server that the terminal 100 can access in a position inside the communication operator network in which an edge computing service is requested, among application servers 600 in respective edge areas in which an identical application is installed for the edge computing service, on the basis of the corresponding service identification information.

The processing unit 220 transfers a server access information request including service identification information to the cloud edge computing policy server 300 such that the cloud edge computing policy server 300 can determine the target application server that the terminal 100 can access.

In this regard, the cloud edge computing policy server 300 identifies a specific service zone matching with corresponding public access information among all service zones of the communication operator network with reference to public access information of the terminal 100 within the service identification information.

To be more specific in this regard, the cloud edge computing policy server 300 may transfer public access information (Pubic IP) allocated to the terminal 100 to an edge platform management device 400 positioned in the communication operator network, thereby acquiring information regarding the area in the communication operator network, in which the terminal 100 requests an edge computing service, from the edge platform management device 400.

In this regard, the edge platform management device 400 identifies private access information (private IP) matching with public access information of the terminal device 100, and may recognize, as area information, a specific service zone, in which the terminal 100 requests an edge computing service, among all service zones of the communication operator network with reference to the identified private access information.

The service zone is recognized by using an access information pool related to each service zone, and the access information pool related to each service zone includes a list regarding private access information differently allocated in respective service zones in the communication operator network.

That is, the edge platform management device 400 recognizes, as area information, the service zone of the access information pool to which private access information of the terminal device 100 belongs, on the basis of access information pool related to each service zone, which is a list of private access information allocated in respective service zones in the communication operator network.

Meanwhile, it is obvious that, in order to recognize a service zone by using an access information pool related to each service zone in this manner, the edge platform management device 400 needs to acquire private access information allocated to the terminal 100 in the communication operator network in advance, thereby matching the same with public access information (public IP) allocated to the terminal 100 and managing the same.

For reference, the edge platform management device 400 may acquire private access information (private IP) allocated to the terminal 100 in advance in the following manner: for example, the same may be received through the communication operator network at a timepoint at which public access information (public IP) for an edge computing service is allocated to the terminal 100 that has already accessed the communication operator network; alternatively, private access information (private IP) may be received, which has been identified from the terminal 100 by the cloud edge computing policy server 300 at a time point at which public access information (public IP) is received from the cloud edge computing policy server 300 for an area information request.

In summary, in an embodiment of the present disclosure, as illustrated in FIG. 3, the edge service supporting server 200 transfers a server access information request including service identification information to the cloud edge computing policy server 300 (②) such that the cloud edge computing policy server 300 requests the edge platform management device 400 to provide information regarding the area in the communication operator network, in which the terminal 100 requests an edge computing service, on the basis of public access information within the service identification information (③). In response thereto, the edge platform management device 400 recognizes a specific service zone in the communication operator network, which matches with public access information according to matching information between the public access information and the private access information, and provides the same, as a reply, to the cloud edge computing policy server 300 (④). Therefore, the cloud edge computing policy server 300 determines that an application server 600 in at least some edge areas related to the specific service zone, among all edge areas, is a target application server, and transfers server access information regarding the same to the edge service supporting server 200 (⑤).

Meanwhile, in connection with transferring a server access information request including service identification information to the cloud edge computing policy server 300 as described above, the processing unit 220 enables the cloud edge computing policy server 300 to distinguish an edge area in which a specific application indicated by application identification information is installed, among all edge areas, as a serviceable edge area according to application identification information (app IP, PKG name) within the service identification information.

In this regard, after distinguishing a serviceable edge area according to application identification information (app IP, PKG name), the cloud edge computing policy server 300 may determine that an application server 600 in an edge area matching with a specific service zone within the communication operator network, in which the terminal 100 requests an edge computing service, among the serviceable edge area, or an application server 600 in an edge area disposed closest to the specific service zone is the target application server to be accessed by the terminal 100.

It is obvious that, to this end, the cloud edge computing policy server 300 needs to match server access information of application servers 600 in respective edge areas with positions in respective service zones of the communication operator and manage the same.

For reference, server access information regarding the target application server determined by the cloud edge computing policy server 300 may be received as a list, and such a list may be received from the cloud edge computing policy server 300 as a redirect message corresponding to HTTP 302.

In addition, the processing unit 220 performs a function of selecting a target application server to be accessed by the terminal 100.

More specifically, when the target application server has been determined such that a list of server access information regarding the same is received from the cloud edge computing policy server 300, the processing unit 220 selects a specific target application server to be accessed by the terminal 100 according to a predefined edge access policy.

Therefore, the edge access policy may be defined as an algorithm that combines conditions such as the amount of resource use (cpu, memory, disk), capacity references (accessing users, the number of sessions, throughput), accounting (time, capacity), and access history.

For example, the processing unit 220 may select a server having the smallest amount of resource use or having the smallest capacity reference, among target application servers on the list according to the edge access policy, may select a server that can minimize accounting (time, capacity), or may select a server having history of access by the terminal 100 that requests an edge computing service, thereby improving the cache hit ratio in the terminal 100.

It is obvious in that, in connection with selection of accounting standards described above, if the public cloud and the communication operator have agreed that only a specific IP band will be free of charge, the server to which server access information of the corresponding IP is allocated may be selected.

Meanwhile, when the target application server list received from the cloud edge computing policy server 300 has no server satisfying the edge access policy, the processing unit 220 may select server access information of an application server currently managed thereby, instead of a target application server on the list, thereby guaranteeing service continuity regarding the edge computing service.

The return unit 230 performs a function of returning the result of processing entrustment.

More specifically, when a target application server that has accessed the terminal 100 is finally selected, the return unit 230 returns server access information regarding the target application server to the terminal 100 as the result of processing entrustment.

Accordingly, upon receiving server access information, which corresponds to as the result of processing entrustment, from the edge service supporting server 200, the terminal 100 may access the target application server according to the corresponding server access information and receive the edge computing service.

In summary, in an embodiment of the present disclosure, as illustrated in FIG. 3, when the target application server to be accessed by the terminal 100 is finally selected, the edge service supporting server 200 returns server access information of the corresponding target application server to the terminal 100 (⑥) such that the terminal 100 can receive the edge computing service requested thereby from the target application server according to the returned server access information (⑦).

Meanwhile, an embodiment of the present disclosure has been described above assuming that an inquiry about area information in which the terminal 100 is positioned is sent to the cloud edge computing policy server 300, and at least one of application servers 600 in respective edge areas matching with the corresponding area information is determined to be the target application server to be accessed by the terminal 100.

However, the present disclosure is not limited to such an embodiment, and it is obvious that, if a session with the terminal 100 requesting an edge computing service exists (if the source IP of the terminal exists), or if caching information maintained for a predetermined time exists with regard to the corresponding terminal 100, information regarding the target application already accessed by the terminal 100 may be returned without sensing an inquiry to the cloud edge computing policy server 300, thereby reducing the network load and the call processing latency.

As described above, an edge service supporting server 200 according to an embodiment of the present disclosure is configured such that an edge area for providing a cloud-based edge computing service is forwardly disposed at a station of a communication operator network such that, when a terminal 100 requests an edge computing service, the terminal 100 can receive the edge computing service through an edge area closest to the terminal 100, thereby implementing an ultra-low latency edge computing service having minimized communication latency.

Particularly, an edge service supporting server 200 according to an embodiment of the present disclosure is configured such that the edge service supporting server 200 operates an application server by processing an entrusted operation according to processing entrustment regarding an edge computing service request from an application client inside a terminal 100 and by returning the processing result to the terminal 100 such that an application client installed in the terminal 100 for an edge computing service can be implemented as a thin client capable of minimizing dependency on the terminal 100.

Figure 4:
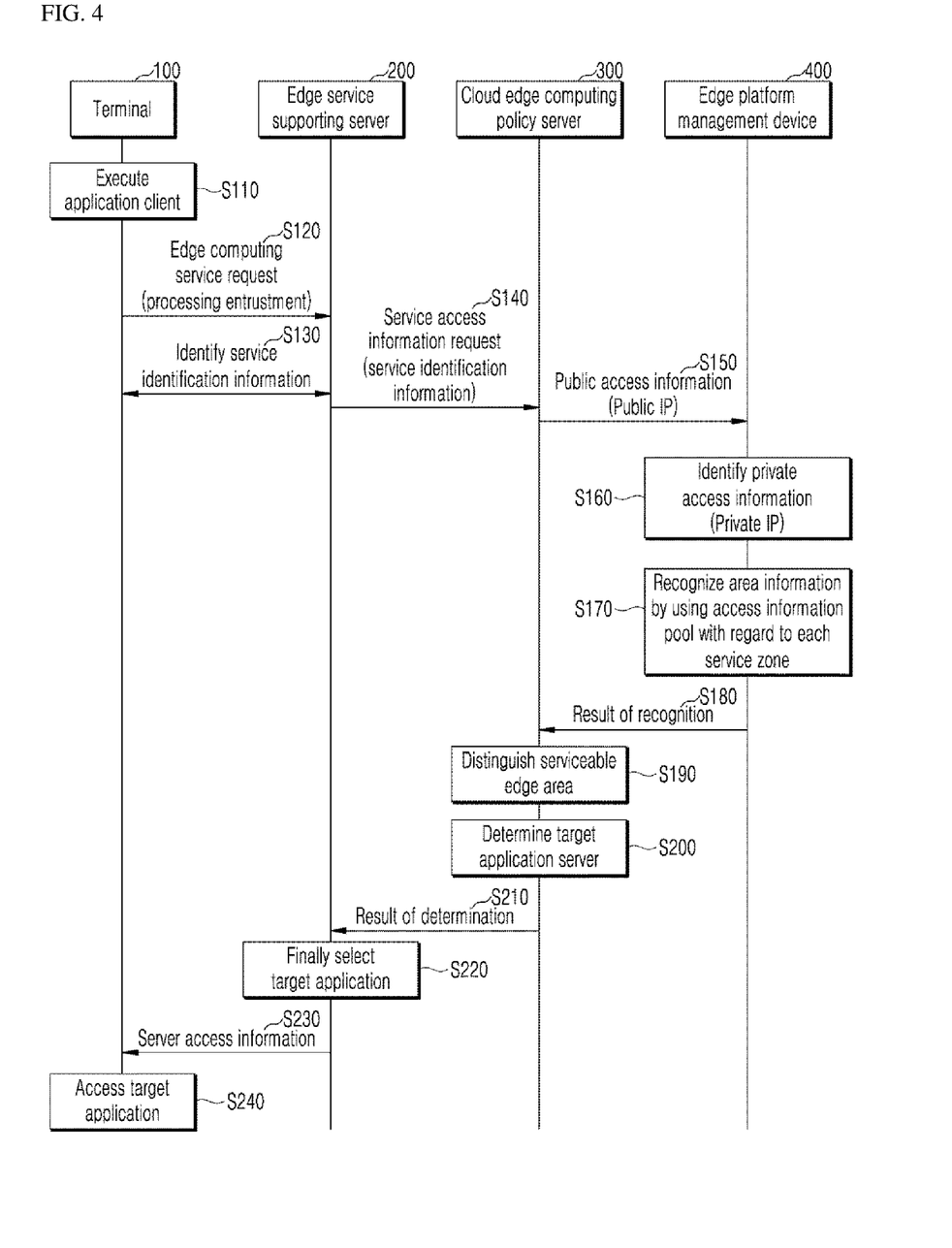
FIG. 4 is a schematic flowchart illustrating a method for operating respective components in a cloud-based edge computing service environment according to an embodiment of the present disclosure.

Hereinafter, a method for operating respective components in a cloud-based edge computing service environment according to an embodiment of the present disclosure will be described with reference to FIG. 4.

Firstly, the terminal 100 transmits an edge computing service request to the edge service supporting server 200 (S110-S120).

In response to execution of an already installed application client, the terminal 100 may transmit an edge computing service request to the edge service supporting server 200 in order to entrust a series of operations necessary to use an edge computing service to the edge service supporting server 200.

Thereafter, upon receiving processing entrustment from the terminal 100, the edge service supporting server 200 identifies service identification information regarding the edge computing service requested by the terminal 100 from the terminal 100 (S130).

In relation to the edge computing service requested by the terminal 100, the edge service supporting server 200 may identify application identification information (app ID, PKG name) indicating a specific application for the edge computing service, and public access information (public IP) allocated to the terminal 100 in the edge computing service environment, as the service identification information.

Thereafter, upon identifying service identification information from the terminal 100, the edge service supporting server 200 transfers a server access information request including service identification information to the cloud edge computing policy server 300 in order to acquire server access information (ME app server IP) regarding a target application server (S140).

In connection with transferring a server access information request to the cloud edge computing policy server 300 in this manner, the edge service supporting server 200 enables the cloud edge computing policy server 300 to distinguish an edge area in which a specific application indicated by application identification information is installed, among all edge areas, as a serviceable edge area according to application identification information (app IP, PKG name) within the service identification information.

Thereafter, the cloud edge computing policy server 300 identifies a specific service zone matching with corresponding public access information among all service zones of the communication operator network with reference to public access information of the terminal 100 within the service identification information received from the edge service supporting server 200 (S150-S180).

The cloud edge computing policy server 300 may transfer public access information (Pubic IP) allocated to the terminal 100 to an edge platform management device 400 positioned in the communication operator network, thereby acquiring information regarding the area in the communication operator network, in which the terminal 100 requests an edge computing service, from the edge platform management device 400.

In this regard, the edge platform management device 400 identifies private access information (private IP) matching with public access information of the terminal device 100, and may recognize, as area information, a specific service zone, in which the terminal 100 requests an edge computing service, among all service zones of the communication operator network with reference to the identified private access information.

The service zone is recognized by using an access information pool related to each service zone, and the access information pool related to each service zone includes a list regarding private access information differently allocated in respective service zones in the communication operator network.

That is, the edge platform management device 400 recognizes, as area information, the service zone of the access information pool to which private access information of the terminal device 100 belongs, on the basis of access information pool related to each service zone, which is a list of private access information allocated in respective service zones in the communication operator network.

Meanwhile, it is obvious that, in order to recognize a service zone by using an access information pool related to each service zone in this manner, the edge platform management device 400 needs to acquire private access information allocated to the terminal 100 in the communication operator network in advance, thereby matching the same with public access information (public IP) allocated to the terminal 100 and managing the same.

For reference, the edge platform management device 400 may acquire private access information (private IP) allocated to the terminal 100 in advance in the following manner: for example, the same may be received through the communication operator network at a timepoint at which public access information (public IP) for an edge computing service is allocated to the terminal 100 that has already accessed the communication operator network; alternatively, private access information (private IP) may be received, which has been identified from the terminal 100 by the cloud edge computing policy server 300 at a time point at which public access information (public IP) is received from the cloud edge computing policy server 300 for an area information request.

Next, the cloud edge computing policy server 300 distinguishes a serviceable edge area according to application identification information (app IP, PKG name), and determines that an application server 600 in an edge area matching with a specific service zone within the communication operator network, in which the terminal 100 requests an edge computing service, among the serviceable edge area, or an application server 600 in an edge area disposed closest to the specific service zone is the target application server to be accessed by the terminal 100 (S190-S200).

It is obvious that, to this end, the cloud edge computing policy server 300 needs to match server access information of application servers 600 in respective edge areas with positions in respective service zones of the communication operator and manage the same.

Furthermore, when the target application server has been determined such that a list of server access information regarding the same is received from the cloud edge computing policy server 300, the edge service supporting server 200 selects a specific target application server to be accessed by the terminal 100 according to a predefined edge access policy (S210).

The edge access policy may be defined as an algorithm that combines conditions such as the amount of resource use (cpu, memory, disk), capacity references (accessing users, the number of sessions, throughput), accounting (time, capacity), and access history.

For example, the edge service supporting server 200 may select a server having the smallest amount of resource use or having the smallest capacity reference, among target application servers on the list according to the edge access policy, may select a server that can minimize accounting (time, capacity), or may select a server having history of access by the terminal 100 that requests an edge computing service, thereby improving the cache hit ratio in the terminal 100.

It is obvious in that, in connection with selection of accounting standards described above, if the public cloud and the communication operator have agreed that only a specific IP band will be free of charge, the server to which server access information of the corresponding IP is allocated may be selected.

Meanwhile, when the target application server list received from the cloud edge computing policy server 300 has no server satisfying the edge access policy, the edge service supporting server 200 may select server access information of an application server currently managed thereby, instead of a target application server on the list, thereby guaranteeing service continuity regarding the edge computing service.

For reference, server access information regarding the target application server determined by the cloud edge computing policy server 300 may be received as a list, and such a list may be received from the cloud edge computing policy server 300 as a redirect message corresponding to HTTP 302.

Thereafter, when a target application server that has accessed the terminal 100 is finally selected, the edge service supporting server 200 returns server access information regarding the target application server to the terminal 100 as the result of processing entrustment. Accordingly, upon receiving server access information, which corresponds to as the result of processing entrustment, from the edge service supporting server 200, the terminal 100 accesses the target application server according to the corresponding server access information and receives the edge computing service (S230-S240).

Figure 5:
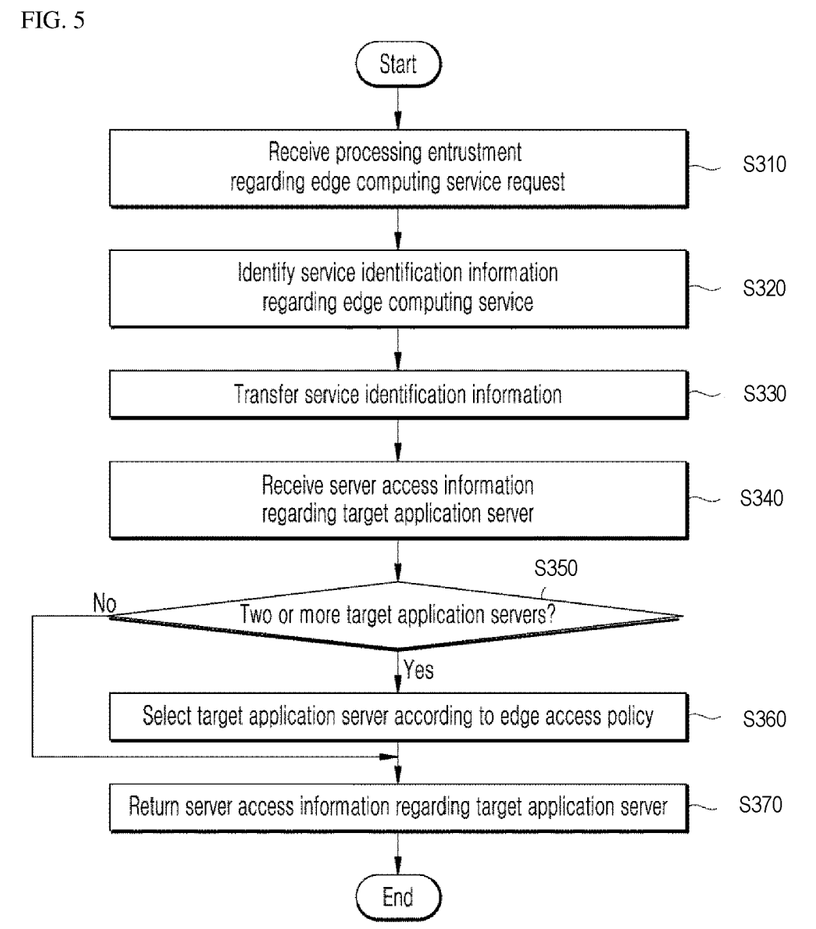
FIG. 5 is a schematic flowchart illustrating a method for operating an edge service supporting server according to an embodiment of the present disclosure.

Hereinafter, a method for operating an edge service supporting server 200 according to an embodiment of the present disclosure will be described with reference to FIG. 5.

Firstly, the receiving unit 210 receives processing entrustment regarding an edge computing service based on a public cloud (S310).

In response to execution of an application client installed in the terminal 100, the receiving unit 210 may receive processing entrustment regarding an edge computing service request from the terminal 100.

That is, in response to execution of an application client installed in the terminal 100, the receiving unit 210 receives an edge computing service request transmitted from the terminal 100 as processing entrustment from the terminal 100 with regard to an edge computing service.

In summary, in an embodiment of the present disclosure, when the application client installed in the terminal 100 is executed as in FIG. 3, the terminal 100 transfers an edge computing service request to the edge service supporting server 200 (①), and the edge service supporting server 200 receives such an edge computing service request as processing entrustment from the terminal 100.

Thereafter, upon receiving processing entrustment from the terminal 100, the processing unit 220 identifies service identification information regarding the edge computing service requested by the terminal 100, from the terminal 100 (S320).

In relation to the edge computing service requested by the terminal 100, the processing unit 220 may identify application identification information (app ID, PKG name) indicating a specific application for the edge computing service, and public access information (public IP) allocated to the terminal 100 in the edge computing service environment, as the service identification information.

The public access information (public IP) allocated to the terminal 100 is utilized as key information for recognizing a service zone in which the terminal 100 is positioned among edge areas managed with regard to respective service zones (for example, Seoul zone, Busan zone, Gwangju zone), and this will be described below in more detail.

Thereafter, upon identifying service identification information from the terminal 100, the processing unit 220 acquires server access information regarding a target application server that the terminal 100 can access in a position inside the communication operator network in which an edge computing service is requested, among application servers 600 in respective edge areas in which an identical application is installed for the edge computing service, on the basis of the corresponding service identification information (S330-S340).

The processing unit 220 transfers a server access information request including service identification information to the cloud edge computing policy server 300 such that the cloud edge computing policy server 300 can determine the target application server that the terminal 100 can access.

In this regard, the cloud edge computing policy server 300 identifies a specific service zone matching with corresponding public access information among all service zones of the communication operator network with reference to public access information of the terminal 100 within the service identification information.

To be more specific in this regard, the cloud edge computing policy server 300 may transfer public access information (Pubic IP) allocated to the terminal 100 to an edge platform management device 400 positioned in the communication operator network, thereby acquiring information regarding the area in the communication operator network, in which the terminal 100 requests an edge computing service, from the edge platform management device 400.

In this regard, the edge platform management device 400 identifies private access information (private IP) matching with public access information of the terminal device 100, and may recognize, as area information, a specific service zone, in which the terminal 100 requests an edge computing service, among all service zones of the communication operator network with reference to the identified private access information.

The service zone is recognized by using an access information pool related to each service zone, and the access information pool related to each service zone includes a list regarding private access information differently allocated in respective service zones in the communication operator network.

That is, the edge platform management device 400 recognizes, as area information, the service zone of the access information pool to which private access information of the terminal device 100 belongs, on the basis of access information pool related to each service zone, which is a list of private access information allocated in respective service zones in the communication operator network.

Meanwhile, it is obvious that, in order to recognize a service zone by using an access information pool related to each service zone in this manner, the edge platform management device 400 needs to acquire private access information allocated to the terminal 100 in the communication operator network in advance, thereby matching the same with public access information (public IP) allocated to the terminal 100 and managing the same.

For reference, the edge platform management device 400 may acquire private access information (private IP) allocated to the terminal 100 in advance in the following manner: for example, the same may be received through the communication operator network at a timepoint at which public access information (public IP) for an edge computing service is allocated to the terminal 100 that has already accessed the communication operator network; alternatively, private access information (private IP) may be received, which has been identified from the terminal 100 by the cloud edge computing policy server 300 at a time point at which public access information (public IP) is received from the cloud edge computing policy server 300 for an area information request.

In summary, in an embodiment of the present disclosure, as illustrated in FIG. 3, the edge service supporting server 200 transfers a server access information request including service identification information to the cloud edge computing policy server 300 (②) such that the cloud edge computing policy server 300 requests the edge platform management device 400 to provide information regarding the area in the communication operator network, in which the terminal 100 requests an edge computing service, on the basis of public access information within the service identification information (③). In response thereto, the edge platform management device 400 recognizes a specific service zone in the communication operator network, which matches with public access information according to matching information between the public access information and the private access information, and provides the same, as a reply, to the cloud edge computing policy server 300 (④). Therefore, the cloud edge computing policy server 300 determines that an application server 600 in at least some edge areas related to the specific service zone, among all edge areas, is a target application server, and transfers server access information regarding the same to the edge service supporting server 200 (①).

Meanwhile, in connection with transferring a server access information request including service identification information to the cloud edge computing policy server 300 as described above, the processing unit 220 enables the cloud edge computing policy server 300 to distinguish an edge area in which a specific application indicated by application identification information is installed, among all edge areas, as a serviceable edge area according to application identification information (app IP, PKG name) within the service identification information.

In this regard, after distinguishing a serviceable edge area according to application identification information (app IP, PKG name), the cloud edge computing policy server 300 may determine that an application server 600 in an edge area matching with a specific service zone within the communication operator network, in which the terminal 100 requests an edge computing service, among the serviceable edge area, or an application server 600 in an edge area disposed closest to the specific service zone is the target application server to be accessed by the terminal 100.

It is obvious that, to this end, the cloud edge computing policy server 300 needs to match server access information of application servers 600 in respective edge areas with positions in respective service zones of the communication operator and manage the same.

For reference, server access information regarding the target application server determined by the cloud edge computing policy server 300 may be received as a list, and such a list may be received from the cloud edge computing policy server 300 as a redirect message corresponding to HTTP 302.

Furthermore, when the target application server has been determined such that a list of server access information regarding the same is received from the cloud edge computing policy server 300, the processing unit 220 selects a specific target application server to be accessed by the terminal 100 according to a predefined edge access policy (S360).

Therefore, the edge access policy may be defined as an algorithm that combines conditions such as the amount of resource use (cpu, memory, disk), capacity references (accessing users, the number of sessions, throughput), accounting (time, capacity), and access history.

For example, the processing unit 220 may select a server having the smallest amount of resource use or having the smallest capacity reference, among target application servers on the list according to the edge access policy, may select a server that can minimize accounting (time, capacity), or may select a server having history of access by the terminal 100 that requests an edge computing service, thereby improving the cache hit ratio in the terminal 100.

It is obvious in that, in connection with selection of accounting standards described above, if the public cloud and the communication operator have agreed that only a specific IP band will be free of charge, the server to which server access information of the corresponding IP is allocated may be selected.

Meanwhile, when the target application server list received from the cloud edge computing policy server 300 has no server satisfying the edge access policy, the processing unit 220 may select server access information of an application server currently managed thereby, instead of a target application server on the list, thereby guaranteeing service continuity regarding the edge computing service.

Thereafter, when a target application server that has accessed the terminal 100 is finally selected, the return unit 230 returns server access information regarding the target application server to the terminal 100 as the result of processing entrustment (S370).

Accordingly, upon receiving server access information, which corresponds to as the result of processing entrustment, from the edge service supporting server 200, the terminal 100 may access the target application server according to the corresponding server access information and receive the edge computing service.

In summary, in an embodiment of the present disclosure, as illustrated in FIG. 3, when the target application server to be accessed by the terminal 100 is finally selected, the edge service supporting server 200 returns server access information of the corresponding target application server to the terminal 100 (⑥) such that the terminal 100 can receive the edge computing service requested thereby from the target application server according to the returned server access information (⑦).

Meanwhile, an embodiment of the present disclosure has been described above assuming that an inquiry about area information in which the terminal 100 is positioned is sent to the cloud edge computing policy server 300, and at least one of application servers 600 in respective edge areas matching with the corresponding area information is determined to be the target application server to be accessed by the terminal 100.

However, the present disclosure is not limited to such an embodiment, and it is obvious that, if a session with the terminal 100 requesting an edge computing service exists (if the source IP of the terminal exists), or if caching information maintained for a predetermined time exists with regard to the corresponding terminal 100, information regarding the target application already accessed by the terminal 100 may be returned without sensing an inquiry to the cloud edge computing policy server 300, thereby reducing the network load and the call processing latency.

As described above, an operating method according to an embodiment of the present disclosure, an edge area for providing a cloud-based edge computing service is forwardly disposed at a station of a communication operator network such that, when a terminal 100 requests an edge computing service, the terminal 100 can receive the edge computing service through an edge area closest to the terminal 100, thereby implementing an ultra-low latency edge computing service having minimized communication latency.

Particularly, according to a method for operating an edge service supporting server 200 according to an embodiment of the present disclosure, the edge service supporting server 200 operates as an application server which processes an entrusted operation according to processing entrustment regarding an edge computing service request from an application client inside a terminal 100, and which returns the processing result to the terminal 100, such that an application client installed in the terminal 100 for an edge computing service can be implemented as a thin client capable of minimizing dependency on the terminal 100.

Meanwhile, an operating method according to an embodiment of the present disclosure may be implemented as a program command that can be executed through various computer means and recorded in a computer-readable medium. The computer-readable medium may include a program command, a data file, a data structure, etc. alone or in combination. Program commands recorded in the medium may be specially designed and configured for the present disclosure, or may be known and usable by those skilled in the art regarding computer software. Examples of the computer-readable recording medium include magnetic media such as a hard disk, a floppy disk, and a magnetic tape, optical media such as a CD-ROM and a DVD, magneto-optical media such as a floptical disk, and hardware devices specially configured to store and execute program commands, such as a ROM, a RAM, and a flash memory. Examples of program commands include not only machine language codes made by a compiler, but also high-level language codes that can be executed by a computer by using an interpreter etc. The above-mentioned hardware devices may be configured to operate as one or more software modules for performing operations of the present disclosure, and vice versa.

Although the present disclosure has been described in detail with reference to exemplary embodiments, the present disclosure is not limited to the above-described embodiments, and the technical idea of the present disclosure is to be understood as encompassing various modifications or changes that can be made by those skilled in the art to which the present disclosure pertains without deviating for the gist of the present disclosure defined by the accompanying claims.

The invention claimed is:

1. An edge service supporting server comprising:
a non-transitory memory that stores instructions; and
a processor that executes the instructions to;
receive processing entrustment regarding a cloud-based edge computing service request from a terminal; and
acquire, on the basis of service identification information regarding an edge computing service requested by the terminal, server access information of a target application server from application servers of each edge area in which an application for the edge computing service is installed, according to the processing entrustment,
wherein the target application server is able to be accessed by the terminal in a communication operator network in which the edge computing service is requested,
wherein the processor:
identifies a specific service zone for the terminal in a communication operator network based on the service identification information such that an application server in at least one edge area of all edge areas related to the specific service zone can be determined as the target application server.

2. The edge service supporting server of claim 1, wherein the processor returns the server access information of the target application server to the terminal as a result of processing the processing entrustment such that the terminal can receive the edge computing service from the target application server according to the server access information.

3. The edge service supporting server of claim 1, wherein the processing entrustment is received from the terminal when an application client for the edge computing service is executed in the terminal.

4. The edge service supporting server of claim 1, wherein the service identification information comprises public access information allocated to the terminal in the edge computing service environment, and the processor identifies the specific service zone in the communication operator network matching with the public access information according to the public access information.

5. The edge service supporting server of claim 4, wherein the specific service zone is identified, according to matching information between the public access information and private access information allocated to the terminal in the communication operator network, as a service zone of service zones of the communication operator network in which the private access information matching with the public access information is allocated.

6. The edge service supporting server of claim 4, wherein the target application server is determined as an application server in an edge area which is included in the specific service zone, or which is closest to the specific service zone.

7. The edge service supporting server of claim 1, wherein
the service identification information comprises application identification information indicating a specific application for the edge computing service, and
an application server in a serviceable edge area of all edge areas in which the specific application is installed is able to be determined as the target application server according to the application identification information.

8. The edge service supporting server of claim 1, wherein the processor selects, when there are two or more target application servers, one of the two or more target applications to be accessed by the terminal according to a predefined edge access policy.

9. A method for operating an edge service supporting server, the method comprising:
receiving processing entrustment regarding a cloud-based edge computing service request from a terminal; and
processing to acquire, on the basis of service identification information regarding an edge computing service requested by the terminal, server access information of a target application server from application servers of each edge area in which an application for the edge computing service is installed, according to the processing entrustment,
wherein the target application server is able to be accessed by the terminal in a communication operator network in which the edge computing service is requested,
wherein the processing includes determining a specific service zone for the terminal in a communication operator network based on the service identification information such that an application server in at least one edge area of all edge areas related to the specific service zone can be determined as the target application server.

10. The method for operating the edge service supporting server of claim 9, further comprising:
returning the server access information of the target application server to the terminal as a result of processing the processing entrustment such that the terminal can receive the edge computing service from the target application server according to the server access information.

11. The method for operating the edge service supporting server of claim 9, wherein the processing entrustment is received from the terminal when an application client for the edge computing service is executed in the terminal.

12. The method for operating the edge service supporting server of claim 9, the processing comprises identifying the specific service zone in the communication operator network matching with the public access information according to the public access information.

13. The method for operating the edge service supporting server of claim 12, wherein the specific service zone is identified, according to matching information between the public access information and private access information allocated to the terminal in the communication operator network, as a service zone of service zones of the communication operator network in which the private access information matching with the public access information is allocated.

14. The method for operating the edge service supporting server of claim 12, wherein the target application server is determined as an application server in an edge area which is included in the specific service zone, or which is closest to the specific service zone.

15. The method for operating the edge service supporting server of claim 9, wherein the service identification information comprises application identification information indicating a specific application for the edge computing service, and the processing comprises determining an application server in a serviceable edge area of all edge areas in which the specific application is installed as the target application server according to the application identification information.

16. The method for operating the edge service supporting server of claim 9, wherein the processing comprises selecting, when there are two or more target application servers, one of the two or more target application servers to be accessed by the terminal according to a predefined edge access policy.

* * * * *